United States Patent
Lee et al.

(10) Patent No.: US 6,466,265 B1
(45) Date of Patent: Oct. 15, 2002

(54) PARALLEL OUTPUT ARCHITECTURES FOR CMOS ACTIVE PIXEL SENSORS

(75) Inventors: Paul P. Lee, Pittsford; Teh-Hsuang Lee, Webster, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/102,306

(22) Filed: Jun. 22, 1998

(51) Int. Cl.[7] ............................................. H04N 5/335
(52) U.S. Cl. ....................................................... 348/308
(58) Field of Search ................................ 348/294, 302, 348/308, 309, 311, 272, 281, 282, 283; H04N 5/335

(56) References Cited

U.S. PATENT DOCUMENTS

| | | | | |
|---|---|---|---|---|
| 4,541,010 A | * | 9/1985 | Alston | 348/283 |
| 5,434,619 A | * | 7/1995 | Yonemoto | 348/241 |
| 5,790,191 A | * | 8/1998 | Zhang | 348/300 |
| 5,953,060 A | * | 9/1999 | Dierickx | 348/241 |

* cited by examiner

Primary Examiner—Tuan Ho
(74) Attorney, Agent, or Firm—Peyton C. Watkins (57) ABSTRACT

An active pixel sensor formed by creating an X-Y array of pixels on a semiconductor substrate. The two dimensional array of pixels is arranged in a plurality of rows and columns that are addressed by addressing circuits formed on the substrate. The active pixel sensor is functionally divided to enable the addressing and reading out of a plurality of pixels simultaneously by providing areas, each of the areas having a row addressing circuit and a column addressing circuit. A signal processing circuit is provided for each area to output a sequential series of pixels in each of the areas. A correlated double sampling circuit is provided

25 Claims, 8 Drawing Sheets

PARALLEL OUTPUT ARCHITECTURES FOR CMOS ACTIVE PIXEL SENSORS

FIELD OF THE INVENTION

This invention relates generally to solid state imager sensors having multiple output channels, and more particularly to architectures based on CMOS active pixel sensors (APS) having multiple output channels that are designed for image capture requiring high frame and pixel rates. It is also applicable to systems where it is desirable to have separate output channels for each of the color defined by a mosaic Color Filter Array (CFA). The architecture is also suitable to other types of x-y addressable imaging array.

BACKGROUND OF THE INVENTION

The prior art has taught image sensors that have requirements to output data at a high pixel data rate. Typically, these high pixel rate requirements are achieved by employing a two-dimensional array (an x-y array) of pixels arranged into two split fields such that the output of one half of the pixels are sent to signal processing circuits located at an edge of the array adjacent to that half. The other half the pixels are output to similar circuits located adjacent to that half. Technologies that can be used to implement such arrays in the prior art have been CMOS APS or CCD. Other prior art teachings have disclosed two-dimensional arrays that are formed into many blocks that each having their own output paths. These multiple output path prior art devices have increased the output data rate for image sensor arrays, however, they are limited in the amount and types of versatility that they provide.

In a conventional CMOS APS, only a single row of the pixel array is addressed and the image data from that row is transferred in parallel to column circuits for signal processing such as offset removal. Each pixel in a selected row is read out in sequence to form one line of output image data. The total number of pixels in the array and the frame rate determine the pixel output rate. For high frame-rate devices or devices having a large pixel count for image capture, the enough to capture and deliver the signal with high fidelity to the image digitization and store unit. For example, a 1000× 1000 (megapixel) array running at 30 frames/second has a pixel output rate of over 30 MHz. However, a 500×500 pixel array running at 1000 frames/sec requires in excess of 250 MHz output data rate. Typical state-of-the-art pixel data channels (both the analog signal and the digitization circuits) are only capable pixel transfer rates in the of 10's of MHz range, and therefore multiple parallel output channels are necessary to achieve high pixel output rate for high frame rate and high pixels count sensors.

From the foregoing discussion, it should be apparent that there remains a need within the art for a more versatile multiple array for achieving high pixel rate data transfers.

SUMMARY OF THE INVENTION

The present invention addresses the foregoing problems in the prior art by providing a CMOS based architecture for active pixel sensors (APS). A semiconductor substrate having a two dimensional array of pixels arranged in a plurality of rows and columns is provided with a row addressing circuit formed on the substrate, a column addressing circuit formed on the substrate, a plurality of signal processing circuits operatively connected to the array of pixels such that each of the signal processing circuits is electrically connected to a predetermined subset of pixels within the array through electrically conductive signal busses, wherein each of the subsets comprises a plurality of pixels, and means for employing the row addressing circuit and the column addressing circuit to select a sequence of pixels having one pixel for each of the subsets and simultaneously transferring signals from each of the pixel sequences to the signal processing circuits.

ADVANTAGEOUS EFFECT OF THE INVENTION

The present invention in providing a CMOS based architecture that is fully compatible with the APS characteristics yields numerous advantages: it provides x-y addressability; sub-windowing and sub-sampling of the pixel array (to provide for example a higher frame rate with fewer pixels per frame); for color image sensors having mosaic Color Filter Arrays it provides a parallel channel connection scheme can be used to preserve the CFA pattern during sub-sampling; and for CFA-based color image sensors, each of the parallel channels can be used for a single color to simplify color signal processing (such as color-specific gain setting and digitization).

DETAILED DESCRIPTION OF THE INVENTION

Figure 1:
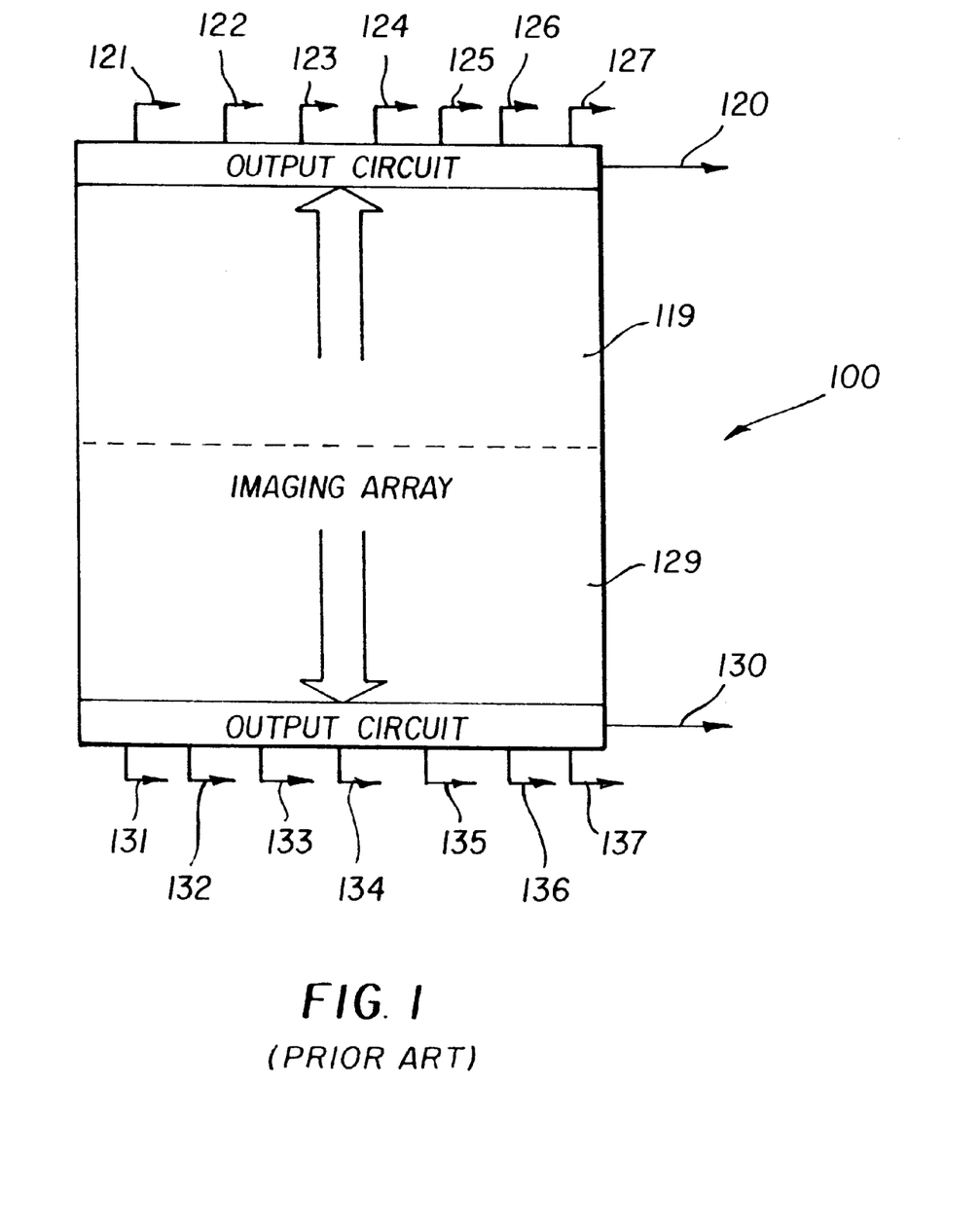
FIG. 1 is a block diagram of a prior art device having two output circuits.

FIG. 1, which is a block diagram of a prior art sensor device wherein the sensor 100 is arranged such that there are two individual photosensing fields 119, 129. The sensor 100 illustrated is a charge coupled device (CCD). Fields 101, 102 each have a horizontal shift register 105, 106 that provides an output path for each of the field 101, 102. The sensor if effectively operated as two individual sensors, thereby doubling the pixel data transfer rate of sensors having only a single field or frame. To further increase pixel data transfer rates, prior art sensors have provided field 101 with output taps 121–127 that operate in conjunction with output 120 to remove charges that are currently being transferred through horizontal shift register 105. In a similar manner field 102 has output taps 131–137 that operate in conjunction with output 130 to remove charges that are currently being transferred through horizontal shift register 106. This yields a total of 8 outputs (130–137). The large number of outputs greatly increases the pixel data transfer rate which is essential for certain systems having high speed requirements. However, no random addressing capability is provided by such The present invention envisions that by connecting multiple (two or more) rows or multiple pixels to signal processing circuits in parallel using signal busses, multiple output circuits, or channels, can be used to lower per channel data rate requirements (FIGS. 2a through 2d) for devices that have high date rate requirements overall. This multiple channel implementation is also applicable to color x-y addressable sensors where it is desirable to have separate output channels for each different color. As an example of separate output channels for each different color is that each of pixels 1, 2, 3 and 4 (in FIGS. 2a through 2d) are each configured to sense a different color (such as Bayer pattern having 2 green, 1 red and 1 blue channels). The column-wise output signal routing connects all the pixels of the same color filter covering to a color specific output channel.

Figure 2A:
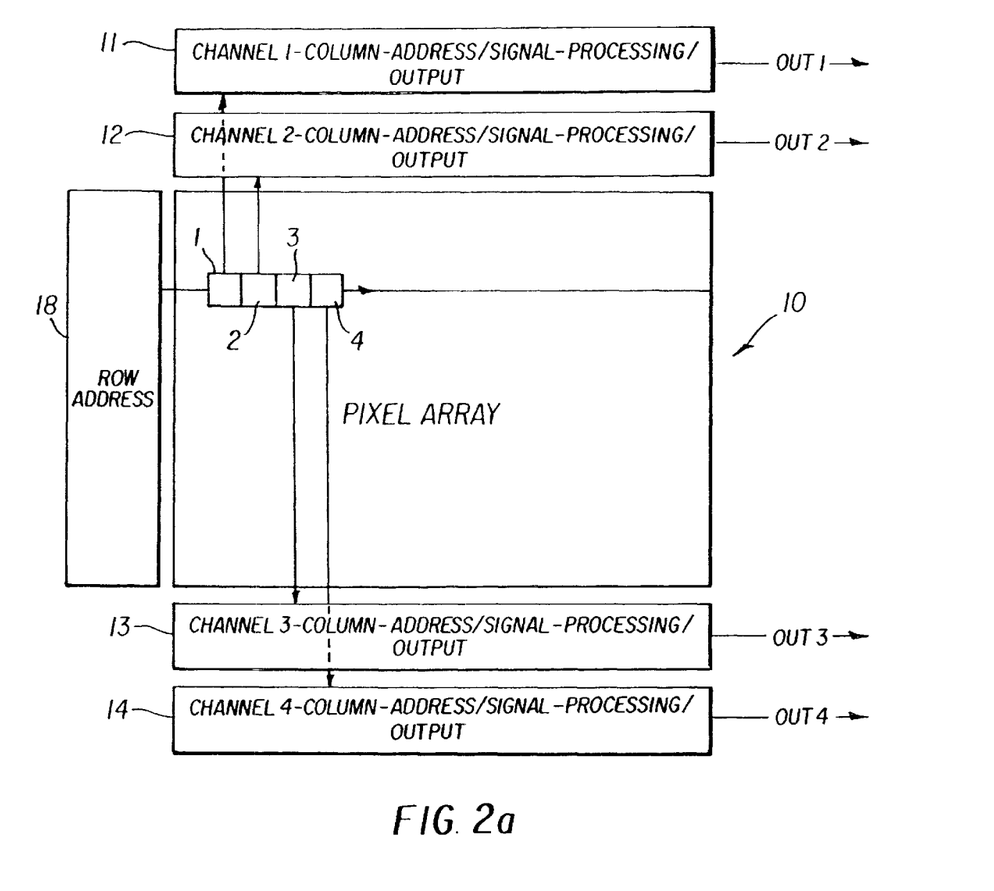
FIG. 2a is a block diagram of an embodiment of the present invention having four output channels.

Referring to FIG. 2a, which is a block diagram of the present invention having a pixel array 10 with four output channels out 1, out 2 out 3 and out 4, the selected pixels 1, 2, 3, and 4 are output simultaneously via four discrete signal processing circuits 11, 12, 13, and 14. As shown in this embodiment the four selected pixels 1, 2, 3 and 4 are selected from a single row that is selected by row address circuit 18 for output. Four parallel channels are thus implemented where 4 pixels from a selected row are addressed and read out to 4 different circuit blocks. Row addressing circuits 18 are provided on chip as envisioned by the present invention. Column addressing circuits are provided on chip also, but as envisioned by the present invention, are part of the signal processing circuits 11, 12, 13 and 14. The row and column addressing circuits, are conventional circuits that are well known within the art of image sensors. The signal processing circuits 11, 12, 13 and 14 as well as the output circuits out 1, out 2 out 3 and out 4 (which will be discussed in more detail below) are essentially identical circuits that are repeated for each of the four channels with variation only for purposes of color. The present invention as envisioned by FIG. 2a will have each channel handle one quarter of the pixels with four pixels being simultaneously processed, one by each channel.

Figure 2B:
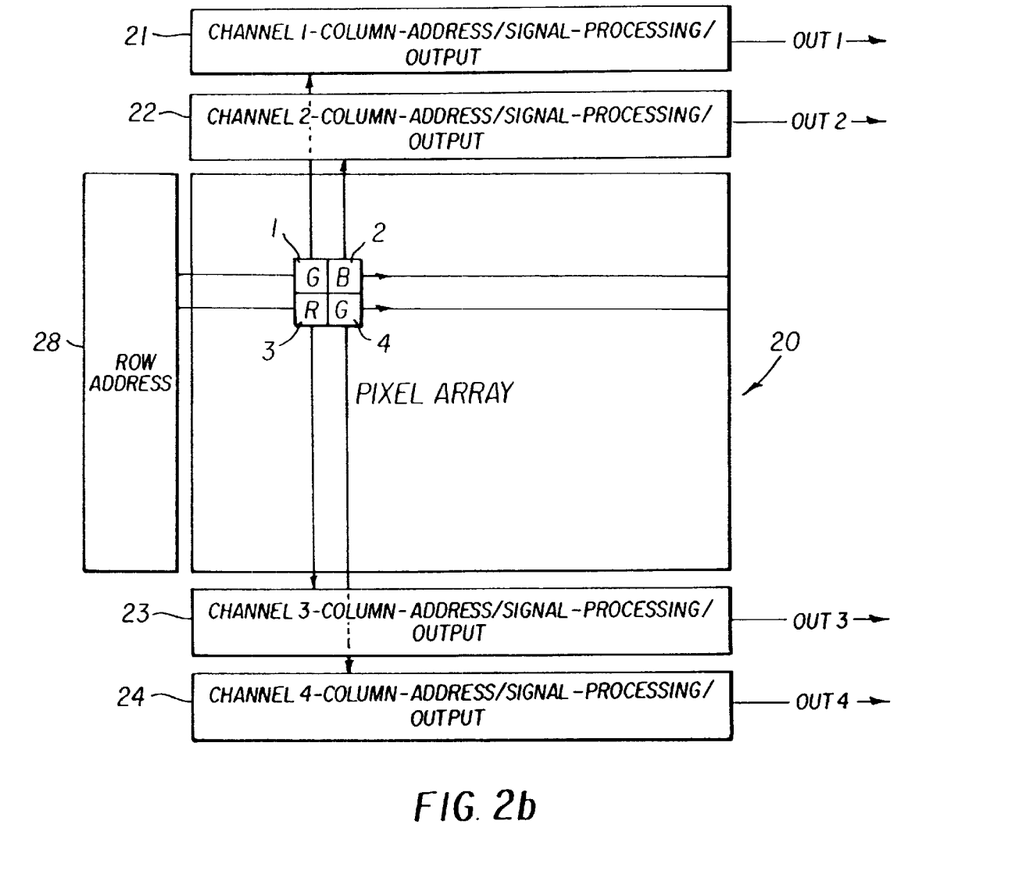
FIG. 2b is a block diagram of an embodiment of the present invention having four output channels.

FIG. 2b is a block diagram of another embodiment of the present invention having four output channels that is a variation of the embodiment discussed in FIG. 2a. Referring to FIG. 2b, pixel array 20 with four output channels out 1, out 2 out 3 and out 4, simultaneously output the selected pixels 1, 2, 3, and 4 via four discrete, signal processing circuits 21, 22, 23, and 24. Here, two consecutive rows are required to select the four pixels that are being processed simultaneously by four different circuit blocks. The pixels as presented in the embodiment shown in FIG. 2b are, typically, part of a mosaic color filter array (CFA) pattern that are typically used within the prior art. As shown the four pixels that are processed in parallel are associated based on color, with two green pixels (indicated by G), one blue pixel (indicated by B) and one red pixel (indicated by R) four each group of four that are simultaneously processed.

Figure 2C:
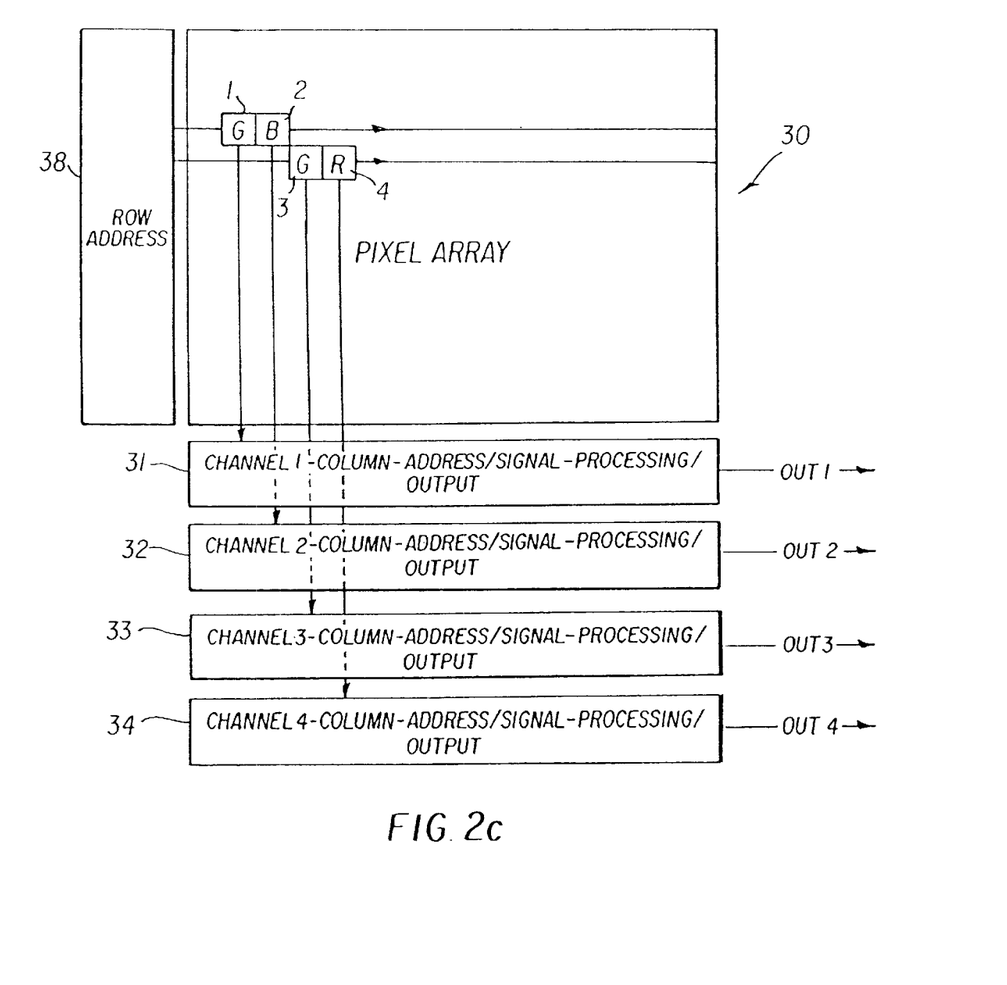
FIG. 2c is a block diagram of an embodiment of the present invention having four output channels.

FIG. 2c is a block diagram of another embodiment of the present invention having four output channels that is a variation of the previous embodiments that have been discussed. Pixel array 30 has four output channels out 1, out 2 out 3 and out 4, with the selected pixels 1, 2, 3, and 4 being output simultaneously via four discrete signal processing circuits 31, 32, 33, and 34. FIG. 2c is a block diagram illustrating a 4 channel variation where the signal processing circuits 31, 32, 33 and 34 are located on only one side of the imaging x-y array. The selected pixels 1, 2, 3 and 4 illustrated here are on consecutive rows, though not necessarily adjacent pixels preventing the formation a mosaic pattern. This is for illustrative purposes to show that a variety of schemes can be used in placement of the circuitry associated with the pixels selected for output.

Figure 2D:
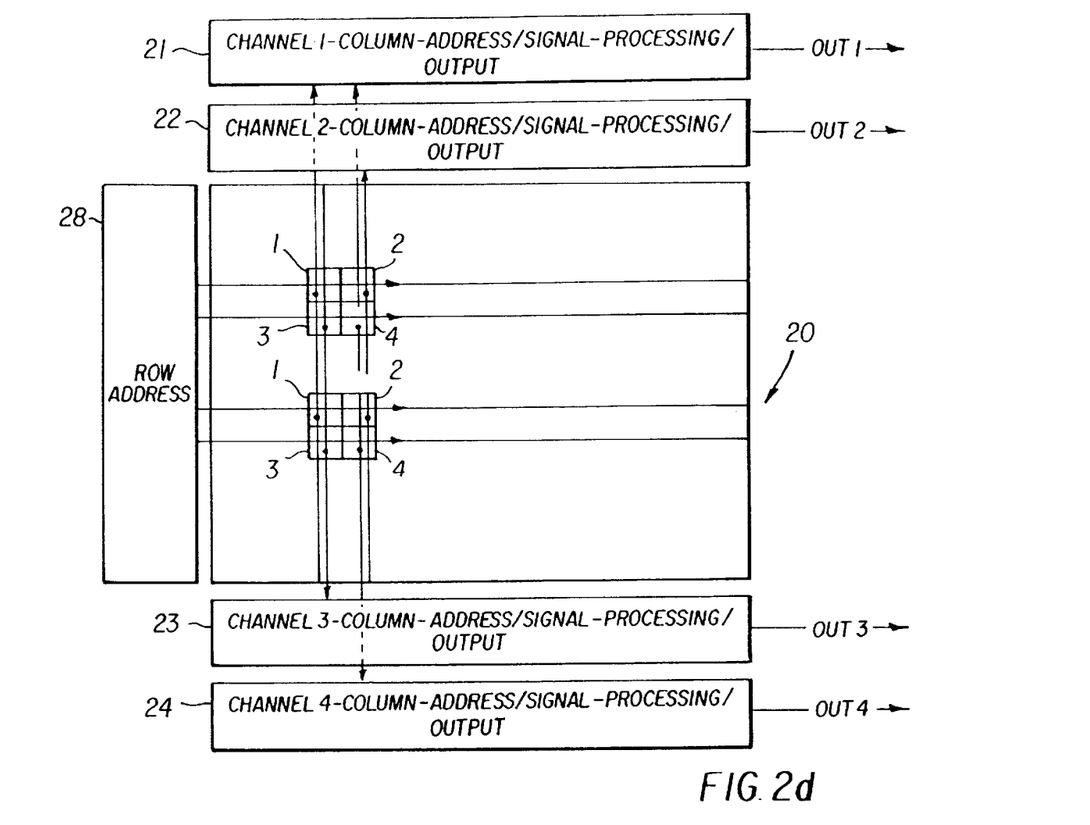
FIG. 2d is a block diagram of an embodiment of the present invention having four output channels where the four pixels simultaneously output on the channels are arranged in a mosaic pattern.

FIG. 2d details the connection matrix of the selected pixels 1, 2, 3 and 4 to the color-specific channels within sensor 20 for the embodiment shown in FIG. 2b illustrating the column signal busses used to connect various pixels to output channels. As seen in FIG. 2d, each column has at least two signal busses connecting half the pixels in that column to pixels in accordance with the channel that those pixels are associated with. Thus, half the columns have signal bus lines interfacing pixel types 1 and 3 with respective signal processing circuits 21, 23 and the other half have signal buss lines interfacing pixel types 2 and 4 with respective signal processing circuits 22, 24.

Figure 2E:
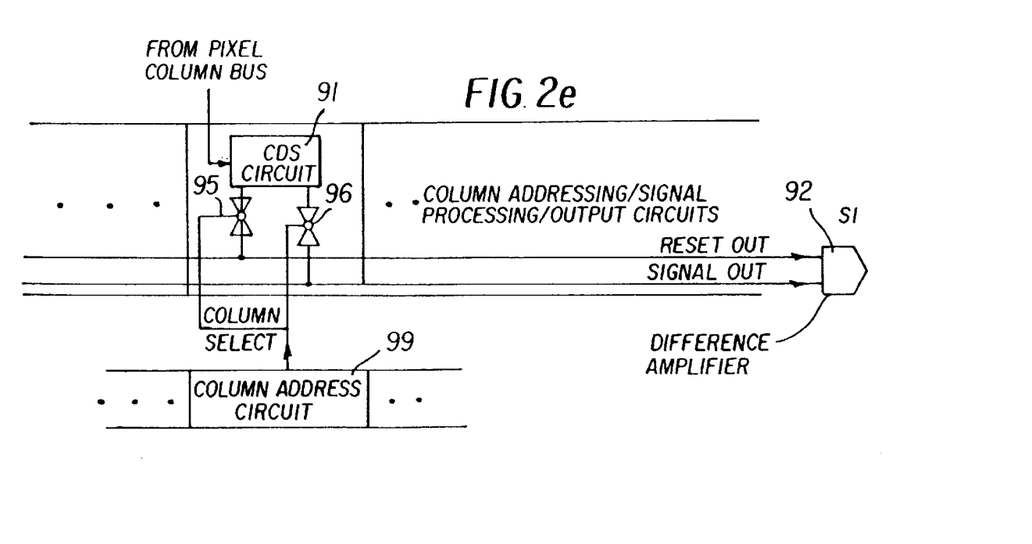
FIG. 2e is a block diagram of an embodiment of the column addressing signal processing circuits of the present invention.

FIG. 2e details a block diagram for interfacing column signal buss lines with signal processing and column addressing circuits. Pixel data arrives from the pixel column bus into a CDS circuit 91 where double sampling takes place. A column select signal is applied to switches 95, 96 to alternately supply difference amplifier 92 with the reset sample and signal sample to provide an adjusted output for each of the columns that are currently selected by the column address circuit. Switches 95, 96 are transistor configurations that can any of CMOS, PMOS or NMOS circuits, depending upon the design criteria that is employed by a given process. The difference amplifier 92 may have its gain value be a fixe value, or the gain value can be programmable. A programmable gain value can be provided either at the metal or at the logic level.

Figure 3A:
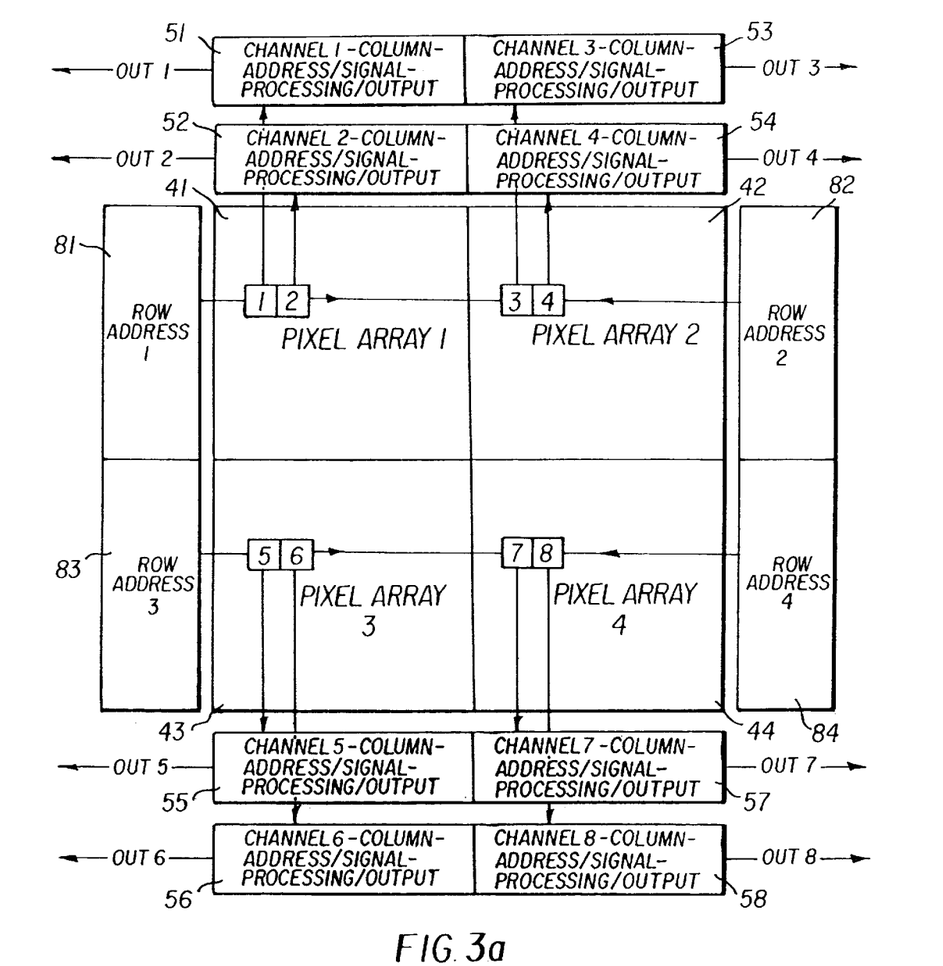
FIG. 3a is a block diagram of an embodiment of the present invention having eight output channels.

Another architecture is to divide the array into quadrants and then apply the same multiple-pixel connection architecture previously discussed to achieve even higher number of parallel channels. FIG. 3a is a block diagram of an embodiment of the present invention wherein the array is divided into four x-y array quadrants 41, 42, 43 and 44 that each have two output channels resulting in eight total output channels, with each output channel having its own column-address/signal processing output (51–58). The four x-y array quadrants 41, 42, 43 and 44 also each have their own individual row address circuits 81, 82, 83 and 84. The invention disclosed here allows the construction of parallel channels to enable either high frame rate or high pixel count image sensors. An 8-channel implementation of a 512×512 array of pixels is capable of transferring 1000 frames/sec resulting in channel data rate on the order of 35 MHz rate (depending on the overhead time involved in addressing, output setup time etc.) which is quite reasonable for incorporating per-column correlated double sampling (CDS) or per channel analog-to-digital conversion in each channel. Using the quadrant architecture (as see in FIG. 3a) and double row output, the loss of pixel fill factor due to the addition of column signal busses (two per column) is minimal. A 16-channel imager can also be constructed by using four column signal busses to output the pixel signals to four parallel addressing/signal-processing/output circuit blocks attached to each imager quadrant.

Figure 3B:
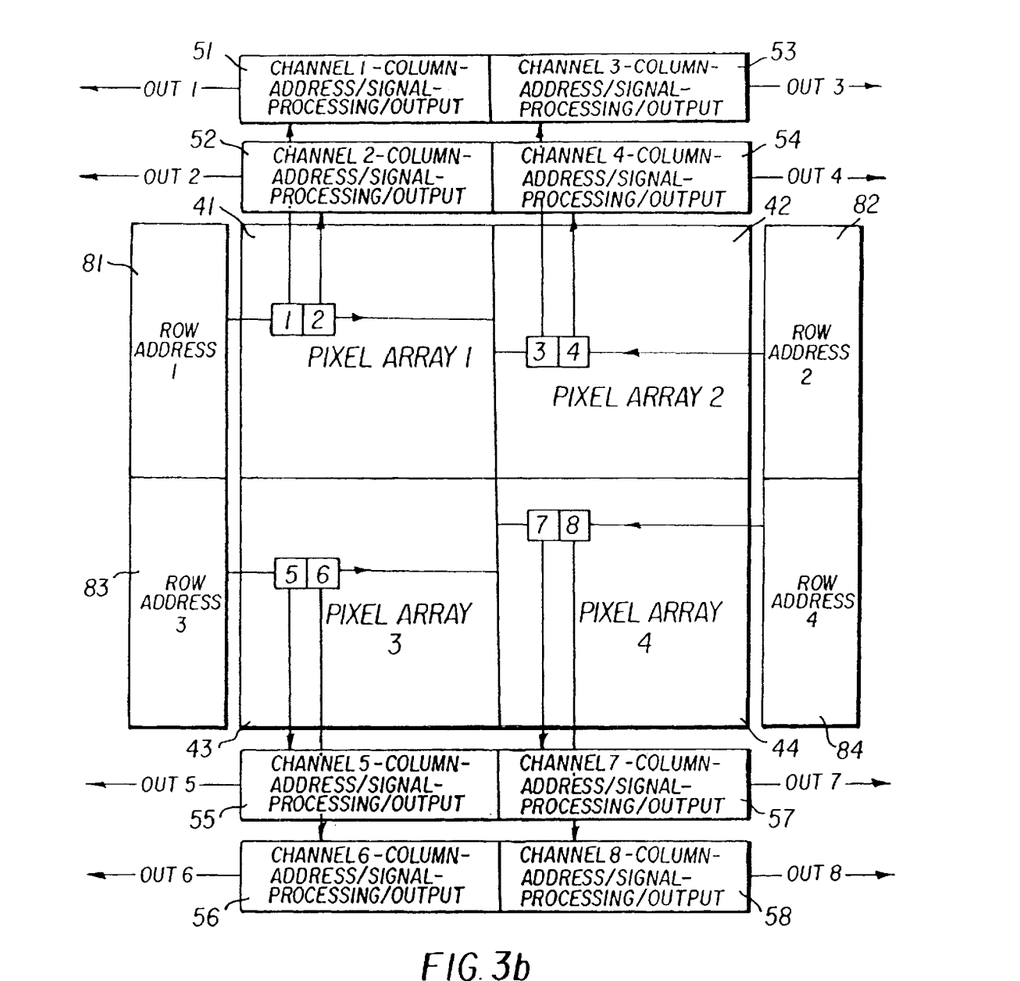
FIG. 3b is a block diagram of an embodiment of the present invention having eight output channels.

FIG. 3b is a block diagram of an embodiment of the sensor having four x-y array quadrants 41, 42, 43 and 44 of present invention having eight output channels as shown in FIG. 3a however, in FIG. 3b the eight output channels are configured to have color specific output channels. The preferred method of arranging output channels in a color specific manner is to employ row addressing techniques that sequences the reading out of adjacent color pixels simultaneously to different channels. The preferred process for design layout of the four x-y array quadrants 41, 42, 43 and 44 and their respective addressing and signal processing circuits shown in FIGS. 3a and 3b, is to form one of the four arrays with its respective addressing and signal processing circuits. The array is then mirrored a first time to create two quadrants with their associate addressing and signal processing circuits. The two quadrant mirrored design is then mirrored again to create the four quadrants 41, 42, 43 and 44. It should also be appreciated that the layout can design all four quadrants individually, and that such a layout will have somewhat different addressing characteristics that may simplify the signal processing. However, the preferred embodiment envisions that the simplicity of the mirrored design technique makes any additional signal processing to join the four quadrants worthwhile.

Figure 4:
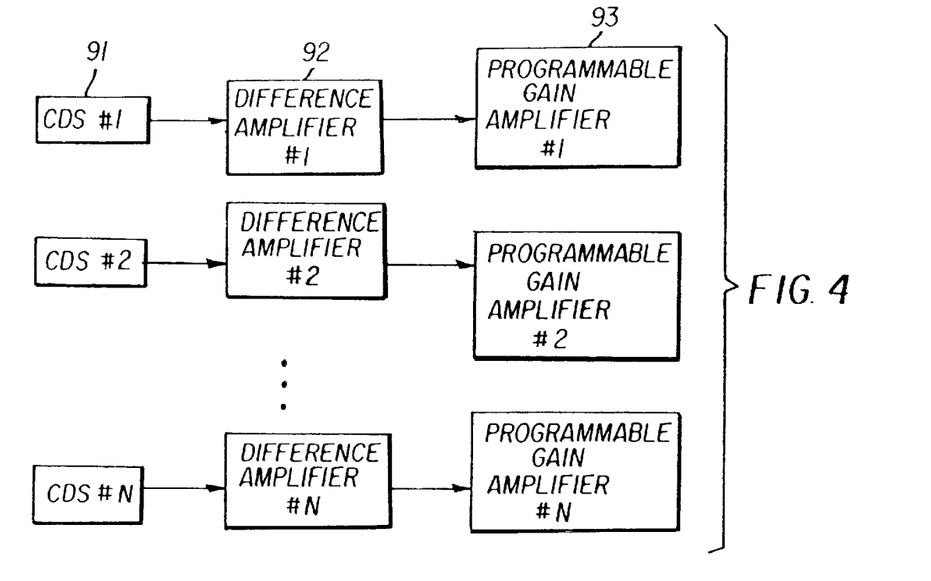
FIG. 4 is a block diagram illustrating the basic functional blocks in the output channels.

FIG. 4 is a block diagram illustrating the basic functional blocks used in the output channels. The output channels are essentially identical to one another, or at least very similar. Correlated double sampling (CDS) 91 is be provided for each of the output channels previously discussed to provide the voltage level signal for each pixel. The preferred embodiment employs a difference amplifier with each of the correlated double sampling units 91 which in turn outputs an adjusted voltage to a programmable gain amplifier (PGA) 93 from each of the channels. The PGA 93 will provide a predetermined amount of gain for each of the channels which is typically based on color but can also be based on other factors.

Figure 5:
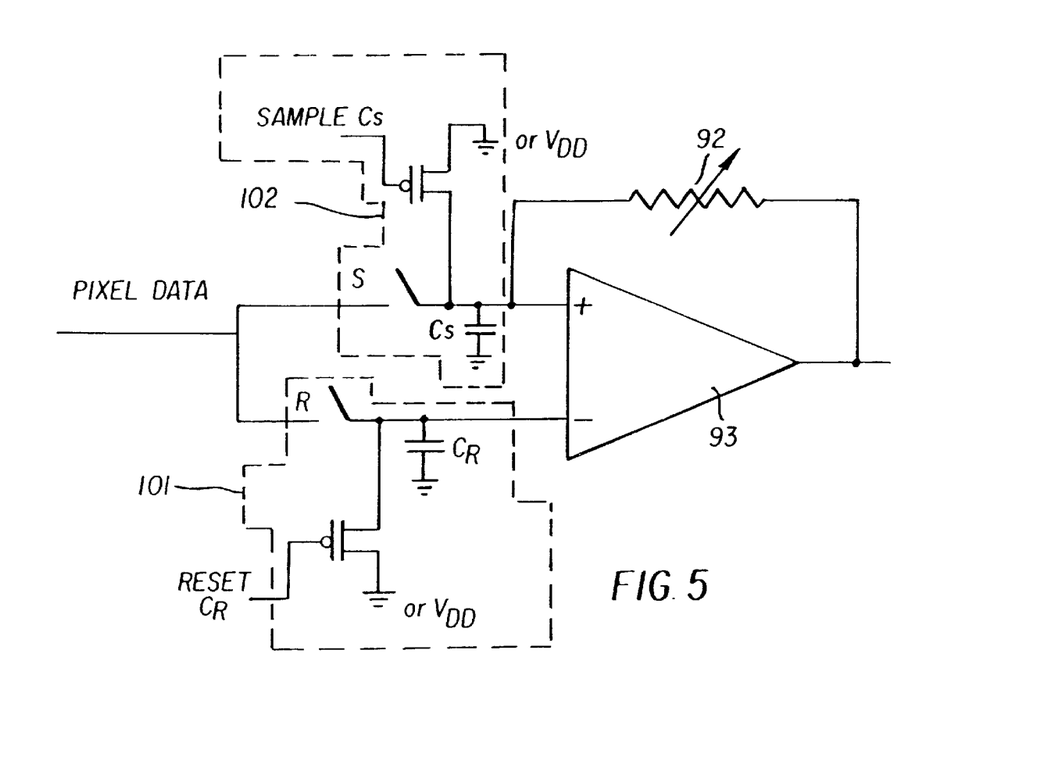
FIG. 5 is a schematic diagram of each of the output channels in the preferred embodiment as envisioned by the present invention.

FIG. 5 is a schematic diagram that generally applies to each of the output channels in the preferred embodiment as envisioned by the present invention. The CDS receives two samples (Reset and Signal) for each pixel, and accordingly provides two sample and hold circuits 101, 102, one for each the Reset and the Signal samples received from the associated pixel. Each the Reset and the Signal samples are stored on their associated capacitor $C_S$, $C_R$ within the CDS 91 when their respective switches S, R are closed. The values stored on capacitors $C_S$ and $C_R$ are applied to the input of difference amplifier 95. These stored Signal and Reset samples are used as inputs to a difference amplifier. The difference amplifier outputs to a PGA which, in the preferred embodiment is a variable resistor on the difference amplifier output. It should be understood, that the PGA can excepts the output of the CDS and have a differential amplifier placed after the PGA, however the preferred embodiment places the differential amplifier immediately after the CDS. It should also be understood that the PGA can use as a variable gain element a transistor, a DAC or the like as well as a variable resistor. The CDS is reset by a transistor circuit that clears both the Signal and the Reset capacitors. In the preferred embodiment PMOS transistors are used to clear the The invention has been described in detail with particular reference to certain preferred embodiments thereof, but it will be understood that variations and modifications can be effected within the spirit and scope of the invention.

PARTS LIST 1 selected pixel
2 selected pixel
3 selected pixel
4 selected pixel
10 pixel array
11 signal processing circuit
12 signal processing circuit
13 signal processing circuit
14 signal processing circuit
18 row addressing circuit
20 pixel array
21 signal processing circuit
22 signal processing circuit
23 signal processing circuit
24 signal processing circuit
28 row addressing circuit
30 pixel array
31 signal processing circuit
32 signal processing circuit
33 signal processing circuit
34 signal processing circuit
38 row addressing circuit
41 pixel array
42 pixel array
43 pixel array
44 pixel array
51 signal processing circuit
52 signal processing circuit
53 signal processing circuit
54 signal processing circuit
55 signal processing circuit
56 signal processing circuit
57 signal processing circuit
58 signal processing circuit
81 row addressing circuit
82 row addressing circuit
83 row addressing circuit
84 row addressing circuit
90 signal processing circuit
91 correlated double sampling unit
92 difference amplifier
93 programmable gain amplifier
95 switch
96 switch
101 reset sample circuit
102 signal sample circuit
100 prior art sensor
119 field
120 output
121 output
122 output
123 output
124 output
125 output
126 output
127 output
129 output
130 output
131 output
132 output
133 output
134 output
135 output
136 output
137 output
129 field
$C_R$ Reset storage capacitor
$C_S$ Signal storage capacitor
R Reset switch
S Signal switch

What is claimed is:

1. An active pixel sensor comprising:
a semiconductor substrate arranged in an array of pixels;
a first addressing circuit formed on the substrate;
two or more second addressing circuits formed on the substrate,
two or more independent readout output channels electrically connected by electrically conductive signal buses to the blocks of pixels such that each of the signal processing circuits is electrically connected to a pixel that is within each block; and
wherein the first addressing circuit selects a plurality of blocks and each of the second addressing circuits substantially simultaneously selects one pixel from each of blocks and at least a portion of the pixels selected by each second addressing circuit is read out substantially simultaneously and in parallel.

2. The sensor of claim 1 wherein the sensor is a color sensor and the each of the pixels selected by the second addressing circuit represents a single color.

3. The sensor of claim 1 wherein each second addressing circuit is operatively connected to a column in an array of pixels.

4. The sensor of claim 1 wherein two second addressing circuits are operatively connected to one column in an array of pixels.

5. The sensor of claim 1 wherein each second addressing circuit is operatively connected to a plurality of pixels in an array of pixels, and wherein the array of pixels can be customized to a particular second addressing circuit by using the electrically conductive signal buses.

6. The active pixel sensor of claim 1 further comprising a correlated double sampling circuit for each second addressing circuit within the sensor.

7. The active pixel sensor of claim 1 further comprising an array of pixels which is functionally divided into a plurality of areas, each of the areas having the first addressing circuit and the second addressing circuit.

8. The active pixel sensor of claim 7 further comprises columns of pixels operatively connected using a plurality of signal busses to a channel comprising a signal processing circuit associated the second addressing circuit such that each of the signal busses corresponds to one of the signal processing channels.

9. The active pixel sensor of claim 8 wherein the sensor is a CMOS sensor.

10. The active pixel sensor of claim 1 further comprises a pinned photodiode within each of the pixels.

11. The active pixel sensor of claim 1 wherein the sensor is enclosed in a digital imaging capture device.

12. The active pixel sensor as in claim 11 wherein the digital imaging capture device is a camera.

13. The active pixel sensor as in claim 1 wherein, the plurality of blocks are read out by the second addressing circuits substantially sequentially in time.

14. An active pixel sensor comprising:
a semiconductor substrate having arranged in an array of pixels;
a first addressing circuit formed on the substrate;
two or more second addressing circuits formed on the subtrate;
two or more independent readout output channels electrically connected by electrically conductive signal buses to the blocks of pixels such that each of the signal processing circuits is electrically connected to a pixel that is within each block; and
wherein the first addressing circuit selects a plurality of blocks and each of the second addressing circuits substantially simultaneously selects one pixel from each of blocks and at least a portion of the pixels selected by each second addressing circuit is read out substantially simultaneously and in parallel; and
wherein the first addressing circuit the two or more second addressing circuits, and the blocks of pixels form an image sensor structure which is replicated by mirroring into at least a second image sensor structure the array is functionally divided into a plurality of areas, each of the areas having a row addressing circuit and a column addressing circuit and each of the areas further being a mirror image of one of the other areas.

15. The active pixel sensor of claim 14 further comprises columns of pixels operatively connected using a plurality of signal busses to a channel comprising a signal processing circuit associated the second addressing circuit such that each of the signal busses corresponds to one of the signal processing channels.

16. The sensor of claim 14 wherein the sensor is a color sensor and the each of the pixels selected by the second addressing circuit represents a single color.

17. The sensor of claim 14 wherein each second addressing circuit is operatively connected to a column in an array of pixels.

18. The sensor of claim 14 wherein two second addressing circuits are operatively connected to one column in an array of pixels.

19. The sensor of claim 14 wherein each second addressing circuit is operatively connected to a plurality of pixels in an array of pixels, and wherein the array of pixels can be customized to a particular second addressing circuit by using the electrically conductive signal buses.

20. The active pixel sensor of claim 14 further comprising a correlated double sampling circuit for each second addressing circuit within the sensor.

21. The active pixel sensor of claim 14 further comprises a pinned photodiode within each of the pixels.

22. The active pixel sensor of claim 14 wherein the sensor is a CMOS sensor.

23. The active pixel sensor of claim 14 wherein the sensor is enclosed in a digital imaging capture device.

24. The active pixel sensor as in claim 23 wherein the digital imaging capture device is a camera.

25. The active pixel sensor as in claim 14 wherein, the plurality of blocks are read out by the second addressing circuits substantially sequentially in time.

* * * * *